(12) United States Patent
Sudo et al.

(10) Patent No.: US 7,064,537 B2
(45) Date of Patent: Jun. 20, 2006

(54) ROTATION ANGLE DETECTING DEVICE

(75) Inventors: Yoshihiro Sudo, Miyagi-ken (JP);
Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 231 days.

(21) Appl. No.: 10/672,701

(22) Filed: Sep. 26, 2003

(65) Prior Publication Data

US 2004/0066186 A1 Apr. 8, 2004

(30) Foreign Application Priority Data

Oct. 3, 2002 (JP) ............................. 2002-290607

(51) Int. Cl.
*G01B 7/30* (2006.01)
(52) U.S. Cl. ............................. 324/207.21; 324/207.25
(58) Field of Classification Search .......... 324/207.12, 324/207.2, 207.21, 207.24, 207.25, 252; 338/32 R, 32 H
See application file for complete search history.

(56) References Cited

U.S. PATENT DOCUMENTS 5,686,837 A * 11/1997 Coehoorn et al. .......... 324/252
6,175,296 B1 * 1/2001 Tokunaga et al. .......... 338/32 R
6,640,652 B1 * 11/2003 Kikuchi et al. ......... 73/862.333
6,882,145 B1 * 4/2005 Ehresmann et al. ........ 324/252
6,920,684 B1 * 7/2005 Shonai et al. ............ 29/603.09
6,927,566 B1 * 8/2005 Apel et al. ............. 324/207.21

FOREIGN PATENT DOCUMENTS

| DE | 19532674 C1 | 11/1996 |
| DE | 19955573 A1 | 5/2001 |
| JP | 11-051694 | 2/1999 |
| WO | WO99/46565 | 9/1999 |

* cited by examiner

*Primary Examiner*—Jay M. Patidar
(74) *Attorney, Agent, or Firm*—Beyer,Weaver &Thomas, LLP.

(57) ABSTRACT

First and second GMR devices formed in a first block and fifth and sixth GMR devices formed in a third block are disposed in a symmetrical manner as to a point of origin. The first and fifth GMR devices, and the second and sixth GMR devices are disposed in a symmetrical manner as to the point of origin, and accordingly the intensity and direction of an external magnetic field applied from a rotating magnet is the equal between the first and fifth GMR devices, and also equal between the second and sixth GMR devices. Thus, combining the first, fifth, second, and sixth GMR devices to form a Wheatstone bridge circuit enables detection precision of rotation angles to be improved.

2 Claims, 5 Drawing Sheets

ROTATION ANGLE DETECTING DEVICE

BACKGROUND OF THE INVENTION

1. Field of the Invention

The present invention relates to a rotation angle detecting device using a GMR device which indicates great change in resistance according to change in external magnetic fields.

2. Description of the Related Art

A conventional rotation angle detecting device is illustrated in FIGS. 4 and 5, with FIG. 4 being a plan view illustrating the principal portions of a conventional rotation angle detecting device, and FIG. 5 a circuit configuration diagram of a magnetism detecting unit. The rotation angle detecting device shown in FIG. 4 is a rotation angle detecting device capable of two outputs for the rotation angle output thereof.

As shown in FIG. 4, with a conventional rotation angle detecting device 1, a board (unshown) is divided into four block (regions) A, B, C, and D, by perpendicularly-intersecting imaginary axial lines for the X axis and Y axis. A pair of Giant Magneto-Resistance devices (hereafter referred to as "GMR devices") G1 and G2 are disposed in the block A, a pair of GMR devices G3 and G4 are disposed in the block B, a pair of GMR devices G5 and G6 are disposed in the block C, and a pair of GMR devices G7 and G8 are disposed in the block D.

A disc-shaped or ring-shaped rotating member 2 is provided facing the four blocks A, B, C, and D, so as to be capable of rotating in the α1 and α2 directions on the point of origin O of the X axis and Y axis.

Magnets M1 and M2 are provided on the perimeter of the rotating member 2 at positions symmetrical with regard to the point of origin O. The one magnet M1 has the inner circumferential side thereof magnetized to the N pole, and the other magnet M2 has the inner circumferential side thereof magnetized to the S pole. Accordingly, a magnetic field heading from the N pole of the magnet M1 to the S pole of the magnet M2 is generated by the rotating member 2, with the GMR devices G1 through G8 of the blocks A through D situated within this magnetic field.

FIGS. 4 and 5 shows the direction of the fixed magnetism of the fixed magnetic layers of the GMR devices with arrows e. As shown in FIG. 4, the direction e of the fixed magnetism is the same within each pair of GMR devices. Also, the direction e of the fixed magnetism is the same for the A and B blocks, and the same for the C and D blocks, but opposite between the A and B blocks and the C and D blocks.

The GMR devices G1 through G8 form two Wheatstone bridge circuits by being connected as shown in FIG. 5. The first Wheatstone bridge circuit is configured of the GMR devices G1 and G2 of the block A and the GMR devices G5 and G6 of the block C, and the second Wheatstone bridge circuit is configured of the GMR devices G3 and G4 of the block B and the GMR devices G7 and G8 of the block D.

With the first Wheatstone bridge circuit, a predetermined electric power source voltage V is applied to the connection between the GMR devices G1 and G5, and the connection between the GMR devices G2 and G6 is grounded. The connection between the GMR devices G1 and G6, and the connection between the GMR devices G2 and G5, are output terminals T1 and T2.

In the same way, with the second Wheatstone bridge circuit, a predetermined electric power source voltage V is applied to the connection between the GMR devices G3 and G7, and the connection between the GMR devices G8 and G4 is grounded. The connection between the GMR devices G3 and G8, and the connection between the GMR devices G7 and G4, are output terminals T3 and T4.

Upon the rotating member 2 being rotated in the α1 and α2 directions, the direction of the magnetic field changes according to the rotation angle. In the event that the magnetic field rotates within a plane parallel to the board on which the GMR devices G1 through G8 are formed, the direction of magnetization of the free magnetic layer (not shown) provided within the GMR devices G1 through G8 changes according to the direction of the rotating magnets M1 and M2. Consequently, the resistances R1 through R8 of the GMR devices G1 through G8 cyclically change with regard to the rotation angle of the rotating member 2.

The direction of the fixed magnetism is opposite for the GMR devices G1 and G6, the GMR devices G2 and G5, the GMR devices G3 and G8, and the GMR devices G4 and G7, so the change due to rotation of the magnets is opposite between the resistance values R1 and R6, the resistance values R2 and R5, the resistance values R3 and R8, and the resistance values R4 and R7.

Accordingly, the differential output between the output terminals T1 and T2 of the first block circuit, and the differential output between the output terminals T3 and T4 of the second block circuit, can both be obtained as sin θ functions, wherein θ is a variable representing the rotation angle of the rotating member 2.

However, with the above-described conventional rotation angle detecting device 1, the GMR devices are arrayed in sets of pairs of GMR devices arrayed in parallel, so in the event of configuring Wheatstone bridge circuits by combining the GMR devices as shown in FIG. 5, with the first block circuit, the center point P1 of the GMR device G1 and the GMR device G6, and the center point P2 of the GMR device G2 and the GMR device G5, do not agree with the point of origin O. In the same way, with the second block circuit, the center point of the GMR device G3 and the GMR device G8, and the center point of the GMR device G4 and the GMR device G7, do not agree with the point of origin O.

This means that magnetic field of the same intensity and direction cannot be applied from the magnets M1 and M2 to the GMR device G1 and the GMR device G6. In the same way, a magnetic field is applied to the GMR device G2 and the GMR device G5, the GMR device G3 and the GMR device G8, and the GMR device G4 and the GMR device G7, with different intensity and direction.

Accordingly, the amount of change as to the rotation angle θ is not the same for the resistances R1 through R8, leading to deterioration in the sine waveform which is the differential output detecting from the first Wheatstone bridge circuit, and in the sine waveform which is the differential output detecting from the second Wheatstone bridge circuit, which has been a problem since the detection accuracy of the rotation detecting device 1 accordingly deteriorates.

SUMMARY OF THE INVENTION

The present invention has been made to solve the above-described problems of the conventional art, and accordingly, it is an object thereof to provide a rotation detecting device having high detection precision regarding the rotation angle detected with the first Wheatstone bridge circuit and the second Wheatstone bridge circuit, by an optimal arrangement of GMR devices.

The rotation angle detecting device according to the present invention comprises: a rotating shaft; a fixed portion where a plurality of GMR devices are provided; a rotating portion for forming a magnetic field and rotating facing the fixed portion; and a Wheatstone bridge circuit formed by connecting the GMR devices; wherein, with the center of the rotating shaft as the point of origin, and imaginary axial lines perpendicularly intersecting at this point of origin as the X axis and Y axis, each of four blocks sectioned by the X axis and Y axis have provided therein a pair of GMR devices disposed parallel to the X axis or Y axis, and such that the GMR devices provided in one block are symmetrical across the point of origin with the GMR devices provided in another block facing the block across the point of origin; and wherein the Wheatstone bridge circuit has a resistance formed by serially connecting a GMR device provided at a position closer to the point of origin within the one block and a GMR device provided at a position closer to the point of origin within the other block, and a resistance formed by serially connecting a GMR device provided at a position farther from the point of origin within the one block and a GMR device provided at a position farther from the point of origin within the other block, with the resistances connected in parallel.

The direction of fixed magnetism of the GMR devices may be the same direction for each GMR device in a pair within a block, and formed opposite for blocks symmetrical across the point of origin.

With the rotation angle detecting device according to the present invention, the center of the magnets forming the magnetic field and the center of GMR devices on opposite sides of the point of origin can be made to agree, by an optimal arrangement of the GMR devices disposed in the blocks. Thus, the intensity and direction of the magnetic field applied from the magnets to the GMR devices can be made the same, such that the resistance values of the GMR devices making up the Wheatstone bridge circuits change by the same amount with regard to the same change in rotation angle, i.e., so that the resistance values of the GMR devices making up the Wheatstone bridge circuits accurately change according to the rotation angle. Thus, the precision of detecting the rotation angle can be improved.

DESCRIPTION OF THE PREFERRED EMBODIMENTS

Figure 1:
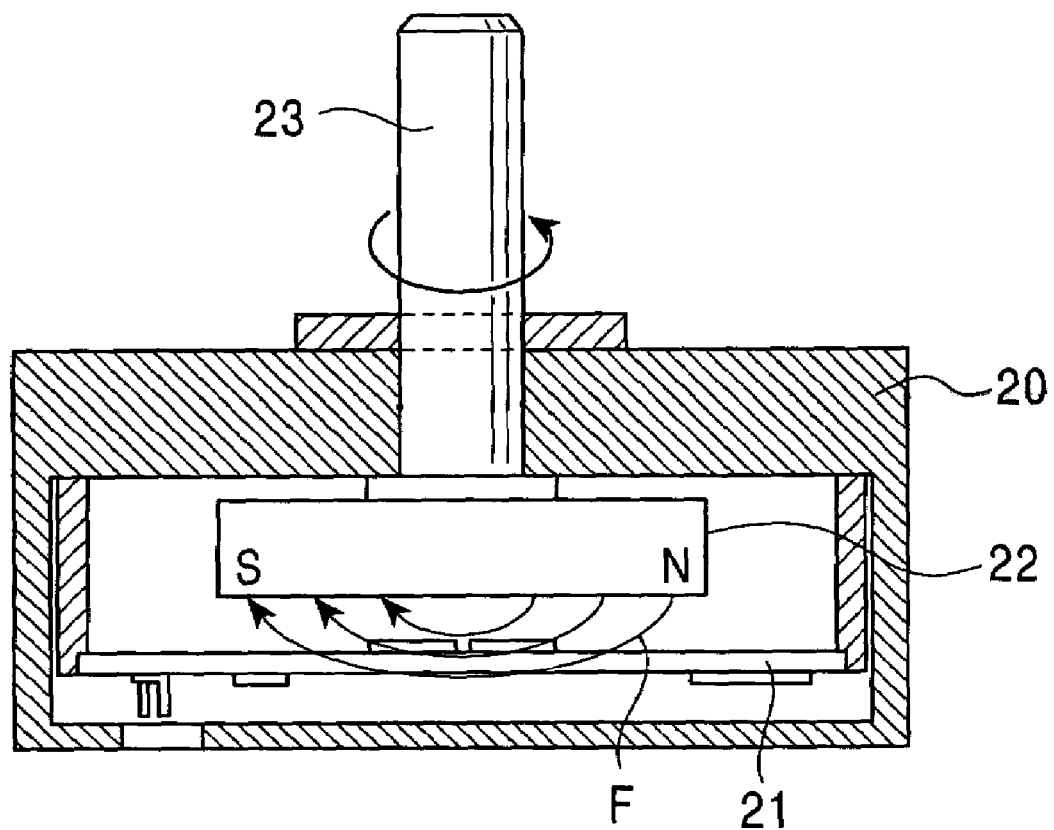
FIG. 1 is a cross-sectional diagram illustrating a rotation detecting device according to the present invention.
Figure 2:
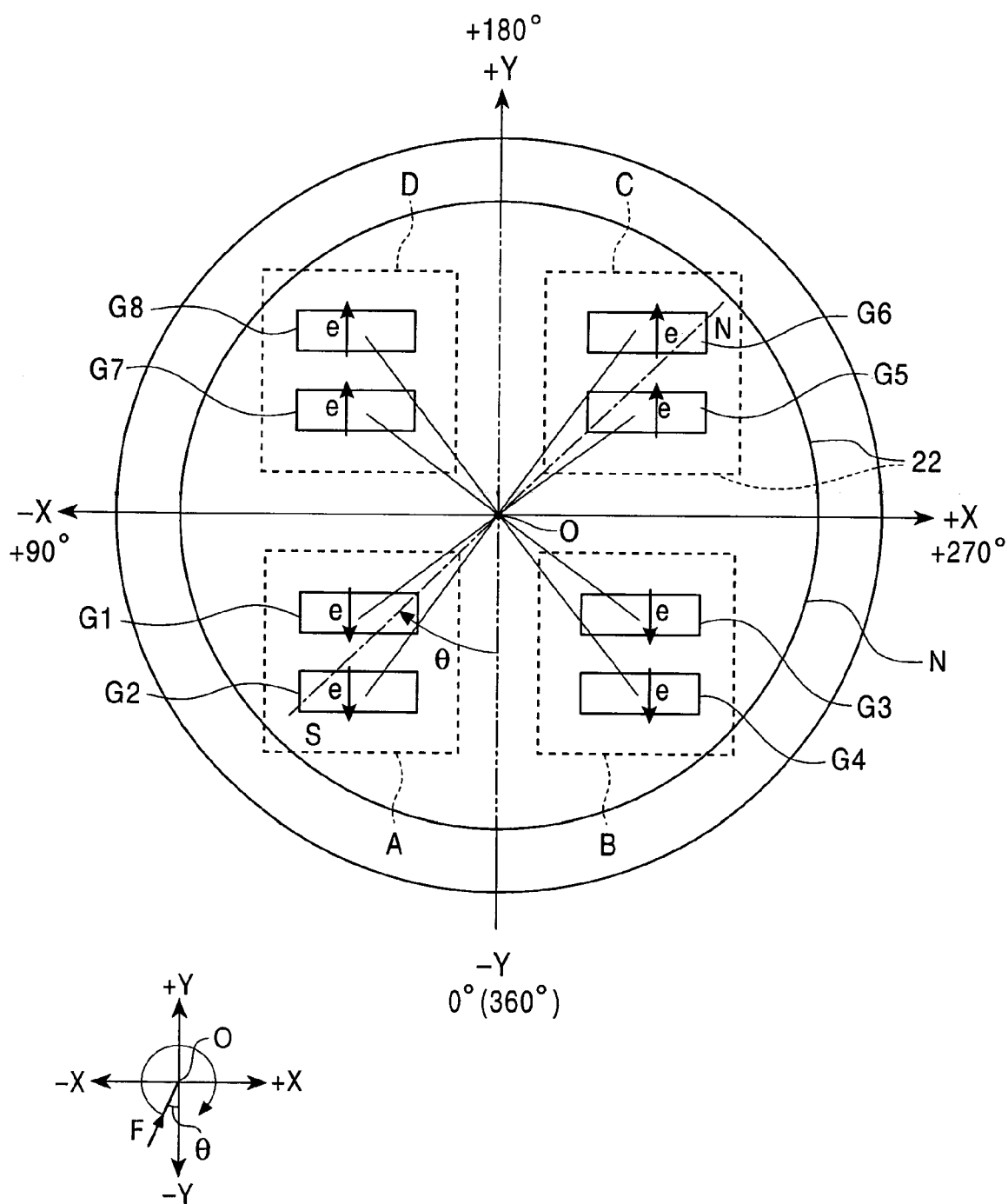
FIG. 2 is a plan view of the board in the device shown in FIG. 1.
Figure 3B:
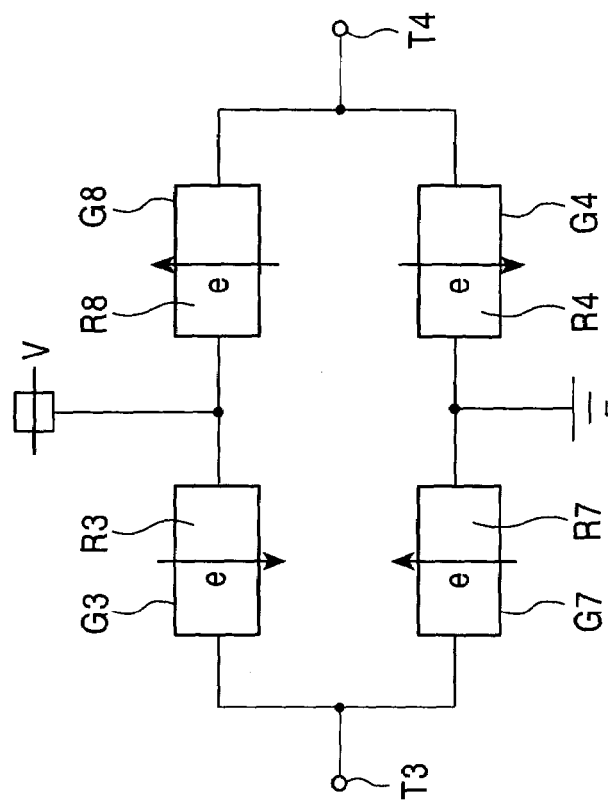
FIGS. 3A and 3B illustrate the circuit configuration of magnetism detecting units, with 3A illustrating a first Wheatstone bridge circuit, and 3B illustrating a second Wheatstone bridge circuit.
Figure 3A:
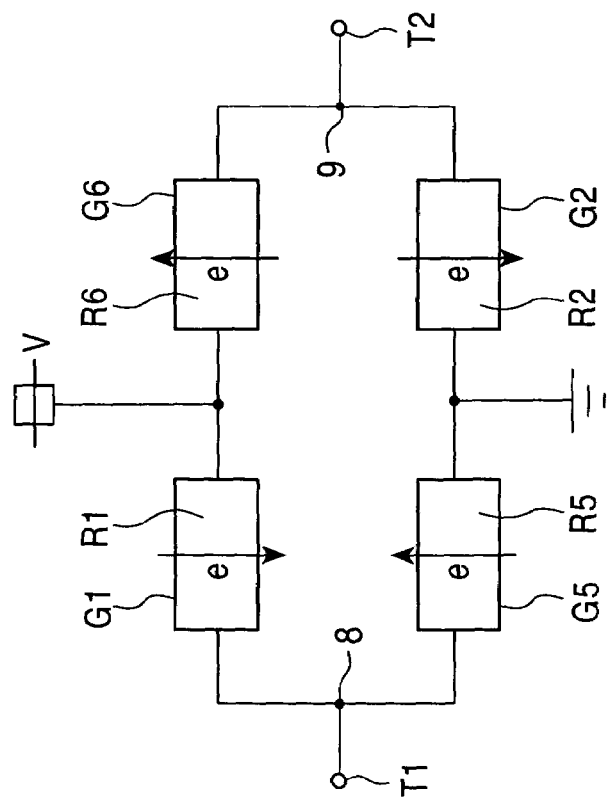
Figure 4:
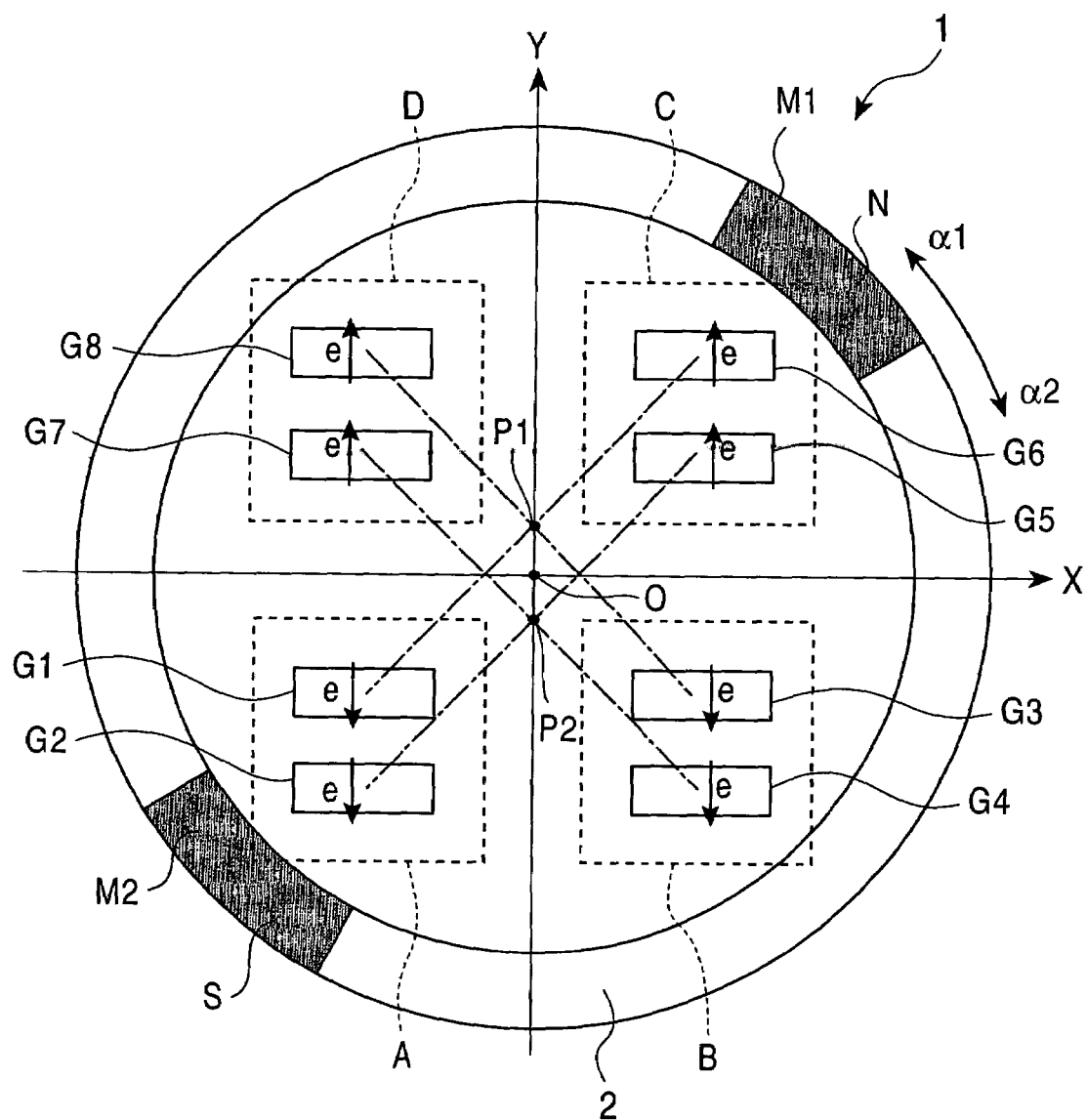
FIG. 4 is a plan view illustrating the principal portions of a conventional rotation angle detecting device.
Figure 5:
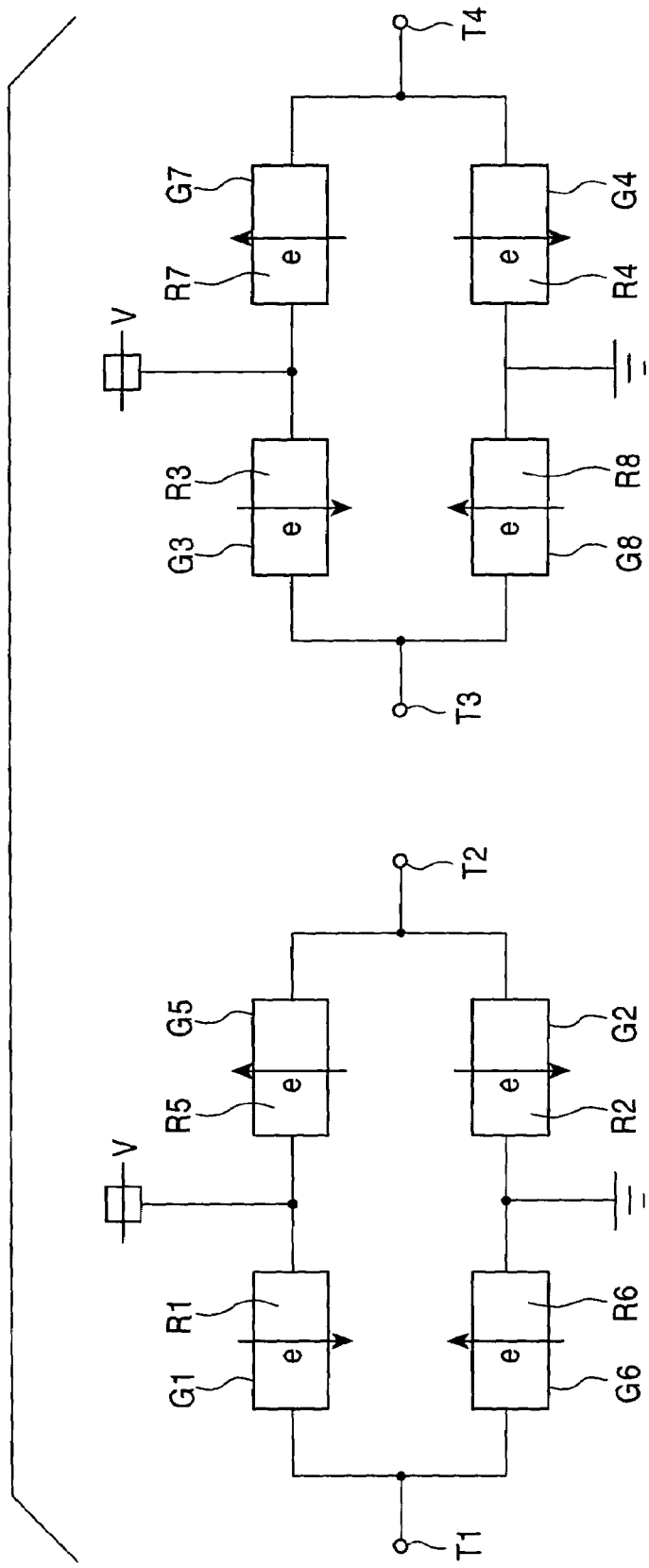
FIG. 5 is a circuit configuration diagram of a magnetism detecting unit.

FIG. 1 is a cross-sectional diagram illustrating a rotation detecting device according to the present invention, FIG. 2 is a plan view of the board in the device shown in FIG. 1, and FIGS. 3A and 3B illustrate the circuit configuration of magnetism detecting units, with 3A illustrating a first Wheatstone bridge circuit, and 3B illustrating a second Wheatstone bridge circuit.

As shown in FIG. 1, the rotation angle detecting device according to the present invention comprises a case 20, a board (fixed portion) fixed within the case 20, and a rotating portion having a disc-shaped magnet 22 formed of ferrite, facing the board 21 in a parallel manner. The magnet 22 provided to the rotating portion has been magnetized so as to be polarized into the N pole and S pole on the face facing the board 21, the direction connecting the N pole and S pole being the radial direction thereof. GMR devices G1 through G8 are formed on the face of the board 21 facing the magnet 22.

A rotating shaft 23 formed of a non-magnetic material is fixed to the rotating portion, and protrudes outward from the case 20, being rotatably supported thereby.

As shown in FIG. 2, the GMR devices G1 through G8 are provided in pairs in four blocks A, B, C, and D, formed by sectioning the board 21 by imaginary axial lines serving as the X axis and Y axis. Note that while FIG. 2 shows all of the pairs of GMR devices being arrayed in parallel to the X axis, but these may be arrayed in parallel to the Y axis instead.

The point of origin O where the X axis and Y axis intersect matches the center of the rotating shaft 23, as well as the rotating center of the magnet 22.

The GMR devices disposed at positions close to the point of origin O, i.e., the GMR device G1, G3, G5, and G7, are all at the same distance from the point of origin O, and the GMR devices disposed at positions farther from the point of origin O, i.e., the GMR device G2, G4, G6, and G8, are all at the same distance from the point of origin O.

As shown in FIG. 2, the direction of fixed magnetism (represented by "e" in FIGS. 2 through 3B) of the GMR devices G1 and G2 provided in the block A and the GMR devices G3 and G4 provided in the block B is the same at −Y, and also, the direction of fixed magnetism of the GMR devices G5 and G6 provided in the block C and the GMR devices G7 and G8 provided in the block D is the same at +Y.

The GMR devices G1, G2, G5, and G6, formed in the blocks A and C, make up a first Wheatstone bridge circuit such as shown in FIG. 3A. As shown in FIG. 3A, with the first Wheatstone bridge circuit, the pair of GMR devices G1 and G5 which are formed at positions close to the point of origin O and have opposite directions of fixed magnetism are serially connected at a node 8, the pair of GMR devices G6 and G2 which are formed at positions farther from the point of origin O and have opposite directions of fixed magnetism are serially connected at a node 9, and further, the serially-connected GMR devices G1 and G5 and the serially-connected GMR devices G6 and G2 are connected in parallel. Electric power source voltage V is connected to the connection of the GMR devices G1 and G6, and the connection of the GMR devices G5 and G2 is grounded. Output terminals T1 and T2 are connected to the nodes 8 and 9, respectively, so that differential output can be obtained from the output terminal T1 and the output terminal T2.

On the other hand, the direction of fixed magnetism is opposite between the two GMR devices G3 and G4 formed in the block B, and the two GMR devices G7 and G8 formed in the block D. The fixed magnetism of the GMR devices G3 and G4 is in the −Y direction, and the fixed magnetism of the GMR devices G7 and G8 is in the +Y direction.

As shown in FIG. 3B, a second Wheatstone bridge is formed of the four GMR devices G3, G4, G7, and G8, of the blocks B and D, in the same way as the first Wheatstone bridge formed of the four GMR devices G1, G2, G5, and G6, of the blocks A and C.

The magnet 22 of the rotating portion has the face thereof facing the board 21 serving as a supporting member magnetized, forming an external magnetic field indicated by the symbol F in FIG. 1, but the GMR devices detect the components of the magnetic field generated by the magnet 22 that are parallel to the surface of the blocks A, B, C, and D.

As shown in FIG. 2, with the first Wheatstone bridge circuit, the center point of an imaginary line connecting the GMR devices G1 and G5 matches the point of origin O, and the center point of an imaginary line connecting the GMR devices G2 and G6 also matches the point of origin O. That is to say, in the first Wheatstone bridge circuit, the GMR devices G1 and G2 formed in the block A and the GMR devices G5 and G6 formed in the block C are disposed symmetrically with regard to the point of origin O. Accordingly, the intensity and direction of the external magnetic field F perpetually applied from the magnet 22 is the same for the GMR devices G1 and G5, and the intensity and direction of the external magnetic field F perpetually applied from the magnet 22 is also the same for the GMR devices G2 and G6.

In the same way, in the second Wheatstone bridge circuit, the GMR devices G3 and G4 formed in the block B and the GMR devices G7 and G8 formed in the block D are disposed symmetrically with regard to the point of origin O, so the intensity and direction of the external magnetic field F perpetually applied from the magnet 22 is the same for the GMR devices G3 and G7 and for the GMR devices G4 and G8.

Upon the rotating shaft 23 being rotated and the magnet 22 rotating while facing the GMR devices, the external magnetic field F of the magnet 22 rotates within a plane parallel to the face of the board 21, and the direction of magnetization of the free magnetic layers of the GMR devices change so as to match the direction of rotation of the magnetic field of the magnet 22.

Due to the Giant Magneto-Resistive effects of the GMR devices G1 through G8, the resistance value drops when the direction of magnetization of the free magnetic layer in a device matches the fixed magnetism direction e, and rises when the direction of magnetization of the free magnetic layer is opposite to the fixed magnetism direction e.

With the rotation angle $\theta$ of the magnet 22 representing the angle between the direction of the external magnetic field F of the magnet 22 and the direction of the fixed magnetism of the GMR devices G1 and G2 formed in the block A (the -Y direction), the resistance values R1 and R2 of the GMR devices G1 and G2 formed on the board 21 are maximal at a rotation angle $\theta$ of 0°, decrease as the rotation angle $\theta$ heads clockwise from 0° toward 180°, are minimal at a rotation angle $\theta$ of 180°, increase as the rotation angle $\theta$ heads from 180° toward 360°, and are maximal again.

On the other hand, the direction and intensity of the external magnetic field F applied to the GMR devices G5 and G6 formed in the block C is the same as that of the external magnetic field F applied to the GMR devices G1 and G2 formed in the block A, but the direction of the fixed magnetism of the GMR devices G5 and G6 formed in the block C is opposite to the direction of the fixed magnetism of the GMR devices G1 and G2 formed in the block A. Accordingly, the change in the resistance values R5 and R6 of the GMR devices G5 and G6 formed in the block C is opposite to that of the fixed magnetism of the GMR devices G1 and G2 formed in the block A.

That is to say, the resistance values R5 and R6 of the GMR devices G5 and G6 formed in the block C are minimal at a rotation angle $\theta$ of 0°, increase as the rotation angle $\theta$ heads clockwise from 0° toward 180°, are maximal at a rotation angle $\theta$ of 180°, decrease as the rotation angle $\theta$ heads from 180° toward 360°, and are minimal again.

With the first Wheatstone bridge circuit, the resistance values R1 and R2 of the GMR devices G1 and G2 formed in the block A and the resistance values R5 and R6 of the GMR devices G5 and G6 formed in the block C change with mutually opposite properties.

Moreover, the intensity and direction of the external magnetic field F of the magnet 22 is the same, so the resistance values R1 and R5 of the GMR devices G1 and G5 change with an equal ratio, and the resistance values R2 and R6 of the GMR devices G2 and G6 also change with an equal ratio. For example, in the event that the resistance values R1 and R2 of the GMR devices G1 and G2 each increase by 20%, the resistance values R5 and R6 of the GMR devices G5 and G6 each decrease by 20%.

Accordingly, under rotations of the magnet 22, the aggregate resistance value R1 of the GMR device G1 and the resistance value R5 of the GMR device G5 is always maintained constant, and the aggregate resistance value R2 of the GMR device G2 and the resistance value R6 of the GMR device G6 is always maintained constant, so the current flowing through the GMR devices G1, G2, G5, and G6 is also constant.

Accordingly, by rotating the magnet 22 with a rotation angle $\theta$, the output waveforms output from the output terminal T1 on the side of the GMR devices G1 and G5, and from the output terminal T2 on the side of the GMR devices G2 and G6 are sin $\theta$ functions mutually off-phase by 180°.

The differential output of the voltage output from the output terminal T1 and the voltage output from the output terminal T2 (sin $\theta$ function) is the output of the first Wheatstone bridge circuit. The differential output from the first Wheatstone bridge circuit is a sin $\theta$ function with noise signals cancelled, and also is a high-precision output signal corresponding to the rotational angle.

The GMR devices G3 and G4 formed in the block B and the GMR devices G7 and G8 formed in the block D to make up the second Wheatstone bridge circuit have the same fixed magnetism direction e as the GMR devices G1 and G2 formed in the block A and the GMR devices G5 and G6 formed in the block C to make up the first Wheatstone bridge circuit.

Further, with the second Wheatstone bridge circuit, the center point of an imaginary line connecting the GMR devices G3 and G7 matches the point of origin O, and the center point of an imaginary line connecting the GMR devices G4 and G8 also matches the point of origin O, with both being disposed symmetrically with regard to the point of origin O, so the intensity and direction of the external magnetic field F applied from the magnet 22 is the same, and accordingly the resistance values R3 and R7 of the GMR devices G3 and G7 change inversely with an equal ratio, and the resistance values R4 and R8 of the GMR devices G4 and G8 also change inversely with an equal ratio.

Accordingly, with the second Wheatstone bridge circuit as well, by rotating the magnet 22 with a rotation angle $\theta$, the output waveforms output from the output terminal T3 on the side of the GMR devices G3 and G7, and from the output terminal T4 on the side of the GMR devices G4 and G8 are sin $\theta$ functions mutually off-phase by 180°. Thus, the differential output from the second Wheatstone bridge circuit is a sin $\theta$ function with noise signals cancelled, and also is a high-precision output signal corresponding to the rotational angle.

As described above, with the angle detecting device 1, rotation angle with high precision can be obtained from both the first Wheatstone bridge circuit and second Wheatstone bridge circuit configured of GMR devices.

Note that while the above-described embodiment comprises first and second Wheatstone bridge circuits, an arrangement may be made with only one Wheatstone bridge circuit.

Also, while the magnet 22 has been described as being a disc in the above embodiment, magnets M1 and M2 may be disposed so as to be symmetrical as to the point of origin O of the ring-shaped rotating member.

Moreover, while the GMR devices have been described as being provided on the board 21, the GMR devices may be formed within an IC chip, whereby the rotation angle detecting device can be miniaturized.

What is claimed is:

1. A rotation angle detecting device comprising:
   a rotating shaft;
   a fixed portion where a plurality of GMR devices are provided;
   a rotating portion for forming a magnetic field and rotating facing said fixed portion; and
   a Wheatstone bridge circuit formed by connecting said GMR devices;
   wherein, with the center of said rotating shaft as the point of origin, and imaginary axial lines perpendicularly intersecting at this point of origin as the X axis and Y axis,
   each of four blocks sectioned by said X axis and Y axis have provided therein a pair of GMR devices disposed parallel to said X axis or Y axis, and such that the GMR devices provided in one block are symmetrical across the point of origin with the GMR devices provided in another block facing the block across the point of origin;
   and wherein said Wheatstone bridge circuit has a resistance formed by serially connecting a GMR device provided at a position closer to said point of origin than the other GMR device within said one block and a GMR device provided at a position closer to said point of origin than the other GMR device within said other block, and a resistance formed by serially connecting a GMR device provided at a position farther from said point of origin than the other GMR device within said one block and a GMR device provided at a position farther from said point of origin than the other GMR device within said other block, with said resistances connected in parallel.

2. A rotation angle detecting device according to claim 1, wherein the direction of fixed magnetism of said GMR devices is the same direction for each GMR device in a pair within a block, and is formed opposite for blocks symmetrical across said point of origin.

* * * * *